US008019912B2

(12) United States Patent
Coletrane et al.

(10) Patent No.: US 8,019,912 B2
(45) Date of Patent: Sep. 13, 2011

(54) BLADE CENTER USB LOCKING

(75) Inventors: Candice Leontine Coletrane, Durham, NC (US); Eric Richard Kern, Chapel Hill, NC (US); Chambrea Michelle Little, Raleigh, NC (US); Robyn Alicia McGlotten, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 12/353,670

(22) Filed: Jan. 14, 2009

(65) Prior Publication Data
US 2010/0180054 A1    Jul. 15, 2010

(51) Int. Cl.
*G06F 13/00*    (2006.01)
(52) U.S. Cl. ............... 710/31; 710/5; 710/8; 710/15; 710/18; 710/20; 710/32; 710/36; 710/38; 710/39; 710/51
(58) Field of Classification Search .............. 710/5, 8, 710/15, 18, 20, 31, 32, 36, 38, 39, 51
See application file for complete search history.

(56) References Cited

U.S. PATENT DOCUMENTS

| 6,058,111 | A | * | 5/2000 | Beyda et al. ................ 370/360 |
| 6,097,723 | A | * | 8/2000 | Fielding et al. ............ 370/395.2 |
| 7,149,796 | B2 | | 12/2006 | Sanders |
| 7,418,525 | B2 | | 8/2008 | Dalton et al. |
| 7,480,303 | B1 | * | 1/2009 | Ngai ......................... 370/395.5 |
| 7,647,583 | B2 | * | 1/2010 | Zeidman et al. ............. 717/121 |
| 7,730,243 | B2 | * | 6/2010 | Kirshtein ...................... 710/73 |
| 2005/0265385 | A1 | | 12/2005 | Cromer et al. |
| 2006/0184785 | A1 | | 8/2006 | Challener et al. |
| 2006/0190739 | A1 | | 8/2006 | Soffer |
| 2008/0104680 | A1 | | 5/2008 | Gibson et al. |
| 2008/0288685 | A1 | | 11/2008 | Dalton et al. |

* cited by examiner

*Primary Examiner* — Tariq Hafiz
*Assistant Examiner* — Jasjit S Vidwan
(74) *Attorney, Agent, or Firm* — Cynthia G. Seal; Law Office of Jim Boice

(57) ABSTRACT

A computer-implemented method, system and computer program product for managing USB ports on blades in a blade center are presented. A set of remotely-transmitted instructions causes a multiplexer to physically disconnect one or more selected USB ports on a blade. In one embodiment, the same one or more selected USB ports are also software-disabled by a USB software-based controller.

8 Claims, 3 Drawing Sheets

BLADE CENTER USB LOCKING

BACKGROUND OF THE INVENTION

1. Technical Field

The present disclosure relates to the field of computers, and specifically to server blades. Still more particularly, the present disclosure relates to managing physical ports used by particular blades in a blade center.

2. Description of the Related Art

While early computer architectures utilized stand-alone single computers, often referenced as Personal Computers (PCs), more powerful modern computer systems often use multiple computers that are coupled together in a common center. An exemplary common center is known as a blade center, which utilizes multiple blades that are coupled by a common backbone of a blade chassis. Each blade is a pluggable board that comprises at least one processor, on-board memory, and an Input/Output (I/O) interface. The multiple blades are capable of communicating with one another, as well as sharing common resources, such as storage devices, monitors, input devices (keyboard, mouse), etc.

As noted above, each blade may contain an I/O interface. An exemplary I/O interface is a Universal Serial Bus (USB) port. Each USB port provides connected USB devices with an address, power, and paired data pipes from the blade. Presently, remotely disconnecting a USB port in a blade is performed via software, which tells the blade's I/O controller to disable a particular USB port on the blade. This software method of disabling a USB port is unsecure and unreliable.

SUMMARY OF THE INVENTION

To address the above described issue, a computer-implemented method, system and computer program product for managing USB ports on server blades is presented. An Advanced Management Module (AMM), which controls server blades in a blade center, includes a USB enablement manager. A remote user sends the USB enablement manager an instruction that, through the use of an intermediary multiplexer (MUX), causes at least one USB port on a particular server blade to be physically disconnected from a USB ports hub. If the USB ports hub is coupled to external resources, then the specific blade is also physically disconnected from the external resources.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
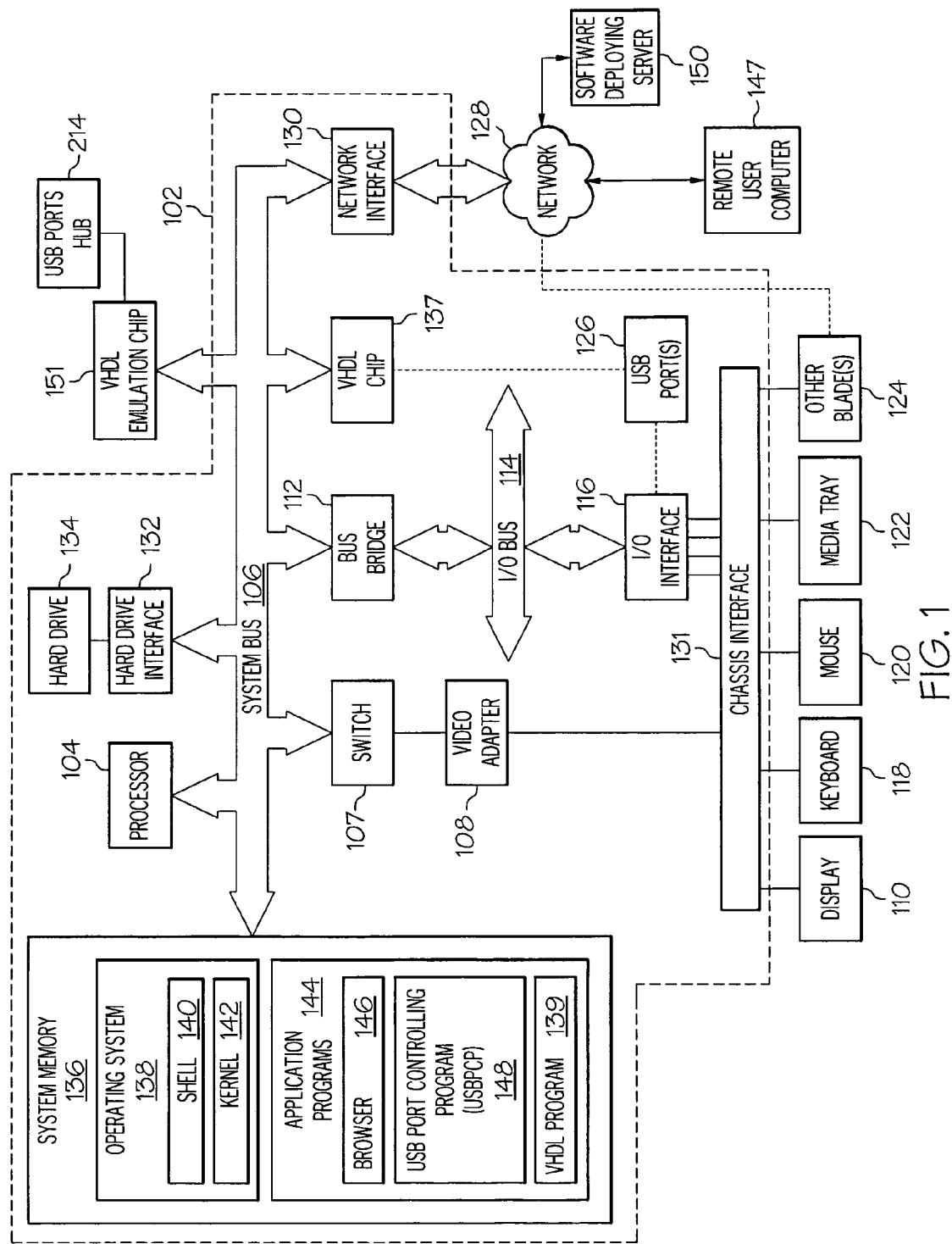
FIG. 1 depicts an exemplary computer blade that may be utilized by the present invention.

With reference now to the figures, and in particular to FIG. 1, there is depicted a block diagram of an exemplary blade 102, in which the present invention may be implemented. Note that some or all of the exemplary architecture shown for blade 102 may be utilized by software deploying server 150, other blades 124, and/or remote user computer 147.

Blade 102 includes a processor unit 104, which may utilize one or more processors each having one or more processor cores, that is coupled to a system bus 106. A video adapter 108, which drives/supports a display 110, is also coupled to system bus 106 via a chassis interface 131 (described in greater detail below). In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional, only upon execution of instructions (e.g., USB Port Controlling Program—USBPCP 148 described below) that perform the method described herein. This switching causes a substantive transformation of the blade 102 from a system in which pending steps and/or results of the herein described method are NOT displayed, into a system in which these results ARE displayed.

System bus 106 is coupled via a bus bridge 112 to an Input/Output (I/O) bus 114. An I/O interface 116 is coupled to I/O bus 114. I/O interface 116 affords communication with various I/O devices either directly or via the chassis interface 131, which is hardware and/or software that allows the blade 102 to be coupled to a chassis backbone in a blade chassis (described in further detail in FIG. 2). Once coupled to the chassis backbone, the blade 102 is able to communicate with other devices besides the display 110, including a keyboard 118, a mouse 120, a media tray 122 (described in greater detail in FIG. 2), other blade(s) 124 that are within a blade center, and (if a VHDL chip 137 is not utilized in a manner described below), USB port(s) 126. Note that while other blade(s) 124 are shown as being coupled to blade 102 via the chassis interface 131, in one embodiment these other blade(s) 124 can be coupled to blade 102 via network 128, particularly if network 128 is a Local Area Network (LAN) within a blade center. While the format of the ports connected to I/O interface 116 may be any known to those skilled in the art of computer architecture, in a preferred embodiment these ports are all Universal Serial Bus (USB) ports.

As depicted, blade 102 is able to communicate with a software deploying server 150 and a remote user computer 147 via network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in blade 102. This volatile memory includes additional higher levels of volatile memory (not shown), including, but not limited to, cache memory, registers and buffers. Data that populates system memory 136 includes blade 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., blade 102) to send and receive network messages to the Internet using HyperText Transfer Protocol (HTTP) messaging, thus enabling communication with software deploying server 150 and other described computer systems.

Application programs 144 in blade 102's system memory (as well as software deploying server 150's system memory) also include a USB Port Controlling Program (USBPCP) 148. USBPCP 148 includes code for implementing the processes described below, and particularly as described in FIGS. 2-3. In one embodiment, blade 102 is able to download USBPCP 148 from software deploying server 150, including in an on-demand basis. Note further that, in one embodiment of the present invention, software deploying server 150 performs all of the functions associated with the present invention (including execution of USBPCP 148), thus freeing blade 102 from having to use its own internal computing resources to execute USBPCP 148.

Also stored in system memory 136 is a VHDL (VHSIC Hardware Description Language) program 139. VHDL is an exemplary design-entry language for Field Programmable Gate Arrays (FPGAs), Application Specific Integrated Circuits (ASICs), and other similar electronic devices. In one embodiment, execution of instructions from USBPCP 148 and/or a signal from remote user computer 147 (described in further detail below in FIG. 2) causes VHDL program 139 to configure VHDL chip 137, which may be an FPGA, ASIC, etc. This programming of VHDL chip 137 causes a substantial transformation of the architecture of blade 102, wherein (assuming that USB port(s) 126 are NOT coupled to I/O interface 116) USB port(s) 126 are now selectively coupled to system bus 106 via VHDL chip 137.

In another embodiment of the present invention, execution of instructions from USBPCP 148 results in a utilization of VHDL program 139 to program a VHDL emulation chip 151. VHDL emulation chip 151 may incorporate a similar architecture as described above for VHDL chip 137. Once USBPCP 148 and VHDL program 139 program VHDL emulation chip 151, VHDL emulation chip 151 performs, as hardware, some or all functions described by one or more executions of some or all of the instructions found in USBPCP 148. That is, the VHDL emulation chip 151 is a hardware emulation of some or all of the software instructions found in USBPCP 148. In one embodiment, VHDL emulation chip 151 is a Programmable Read Only Memory (PROM) that, once burned in accordance with instructions from USBPCP 148 and VHDL program 139, is permanently transformed into a new circuitry. Thus, VHDL emulation chip 151 is also properly viewed as a machine that is under the control of blade 102. Note that while VHDL emulation chip 151 is depicted as being a different entity from blade 102, in another embodiment VHDL emulation chip 151 may be an integral part of blade 102. In the present invention, therefore, VHDL emulation chip 151 may be hardware-configured to selectively connect/disconnect blade 102 from a USB ports hub 214 (described in further detail below in FIG. 2).

The hardware elements depicted in blade 102 are not intended to be exhaustive, but rather are representative to highlight essential components required by the present invention. For instance, blade 102 may include alternate memory storage devices such as magnetic cassettes, Digital Versatile Disks (DVDs), Bernoulli cartridges, and the like. These and other variations are intended to be within the spirit and scope of the present invention.

Figure 2:
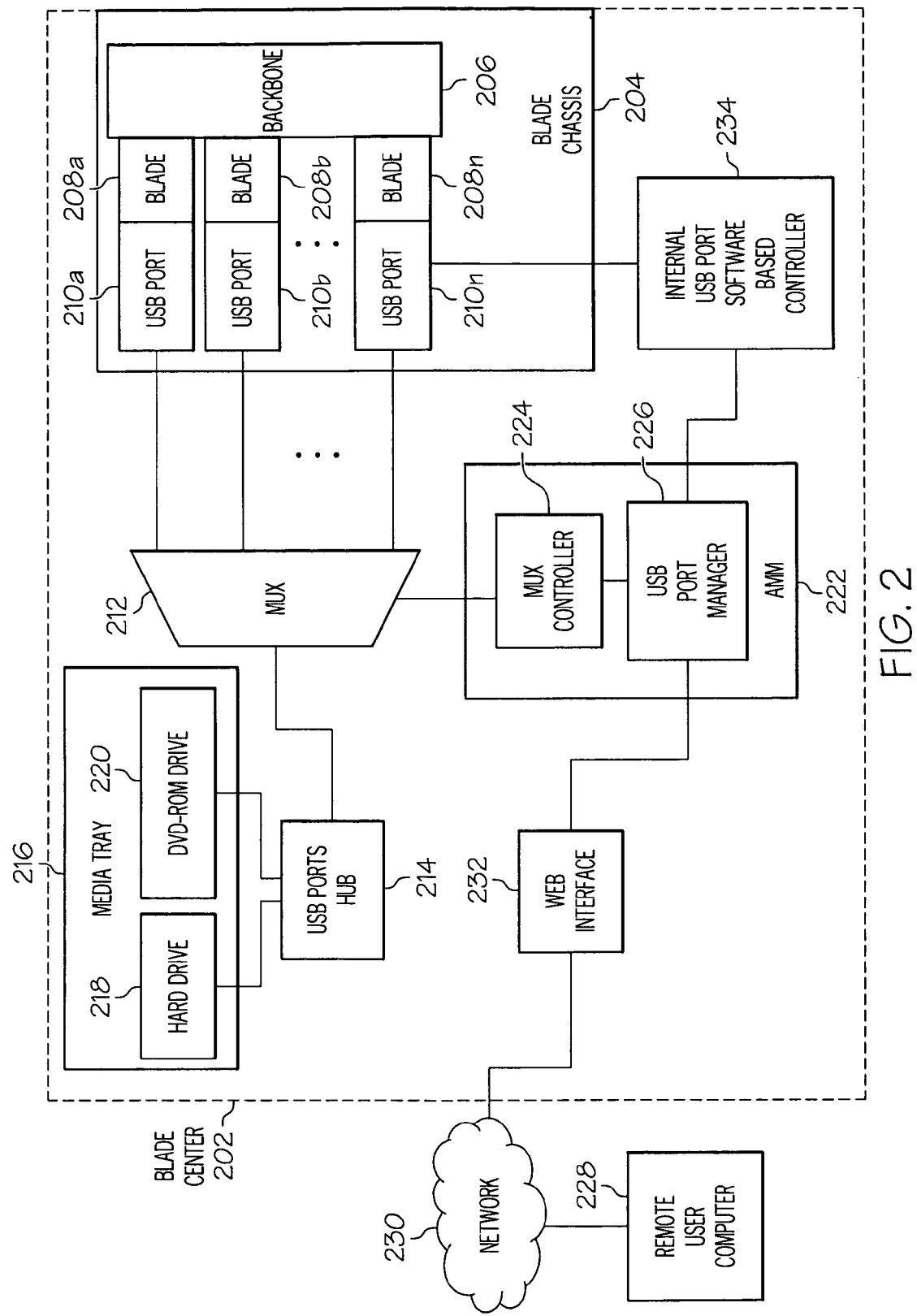
FIG. 2 illustrates a unique and novel blade center in which USB ports can be physically disconnected from a specific blade through the use of remotely transmitted instructions.

Referring now to FIG. 2, an exemplary blade center 202, in which the present invention may be implemented, is presented. Blade center 202 includes a blade chassis 204. Within blade chassis 204 is a backbone 206, which physically couples blades 208a-n (where "n" is an integer) in a manner that permits them to intercommunicate. Blade 208a is represented in FIG. 1 as blade 102, and blades 208b-n are depicted in FIG. 1 as other blade(s) 124. Each of the blades 208a-n comprise a different local physical port, which is depicted as input/output ports shown as USB ports 210a-n. Note that each of the blades 208a-n may have one or more USB ports 210a-n, even though only one USB port is shown for each of the blades.

Each of the USB ports 210a-n is coupled to a multiplexer (MUX) 212, which is also coupled to a USB ports hub 214. The USB ports hub 214 provides multiple USB ports that are coupled to devices within a media tray 216 (represented in FIG. 1 as media tray 122). Media tray 216 is a physical board within the blade center 202 (e.g., within a same cabinet as the blades 208a-n) that contains different media devices. Thus, depicted within media tray 216 for exemplary purposes are a hard drive 218 and a DVD-ROM drive 220.

Coupled to MUX 212 is an Advanced Management Module (AMM) 222. AMM 222 includes a MUX controller 224, which controls which of the USB ports 210a-n is to be physically connected/disconnected to/from the USB ports hub 214. That is, MUX 212 selectively causes a physical connection or a physical break to occur, such that a specific USB port is mechanically connected or mechanically disconnected from the USB ports hub 214. By extension, if a specific USB port 210 is mechanically disconnected from the USB ports hub 214, then it is also physically disconnected from any device within the media tray 216. Alternatively, a different MUX 212 can be assigned to each device within the media tray 216 (or any other device), such that different MUXs 212 can selectively (and preferably, sequentially in order to avoid data collisions) couple a particular USB port to one or more specific devices within the media tray 216.

Note that MUX controller 224 is also coupled to a USB enablement manager 226. USB enablement manager 226 is a software-based logic that instructs the MUX controller 224 as to which USB port 210 is to be physically disconnected from the USB ports hub 214. Directions to USB enablement manager 226 can be provided by a remote user computer 228 (depicted in FIG. 1 as remote user computer 147). Using the connections provided by network 230 (depicted in FIG. 1 as network 128), and web interface 232 (depicted in FIG. 1 as network interface 130), the remote user computer 228 can send software instructions to USB enablement manager 226 to cause the physical/mechanical connection/disconnection of specific USB ports 210 to external devices (using MUX 212). These software instructions can also be used to connect/disconnect specific USB ports 210 using software instructions to an internal USB port software-based controller 234. Internal USB port software-based controller 234 causes specific USB ports 210 to be logically disabled, such that they may or may not be physically disconnected by the MUX 212, but are independently and redundantly enabled/disabled by software instructions. If the USB ports 210 are directly under the management control of internal USB port controller 234, then internal USB port software-based controller 234 directly disables/enables different USB ports 210 in accordance with instructions sent by the remote user computer 228. Alternatively, if the USB ports 210 are under the direct control of an internal blade logic (e.g., USBPCP 148 shown in FIG. 1), then the instructions from the remote user computer 228 are passed through the internal USB port software-based controller 234 to processor 104 (shown in FIG. 1), which causes the specific USB port 210 to be enabled/disabled. As described above, this enablement/disablement may be caused by the programming of the VHDL chip 137 described above in FIG. 1, such that specific USB ports 210 are unable to communicate with the system bus (shown in FIG. 1 as system bus 106).

Figure 3:
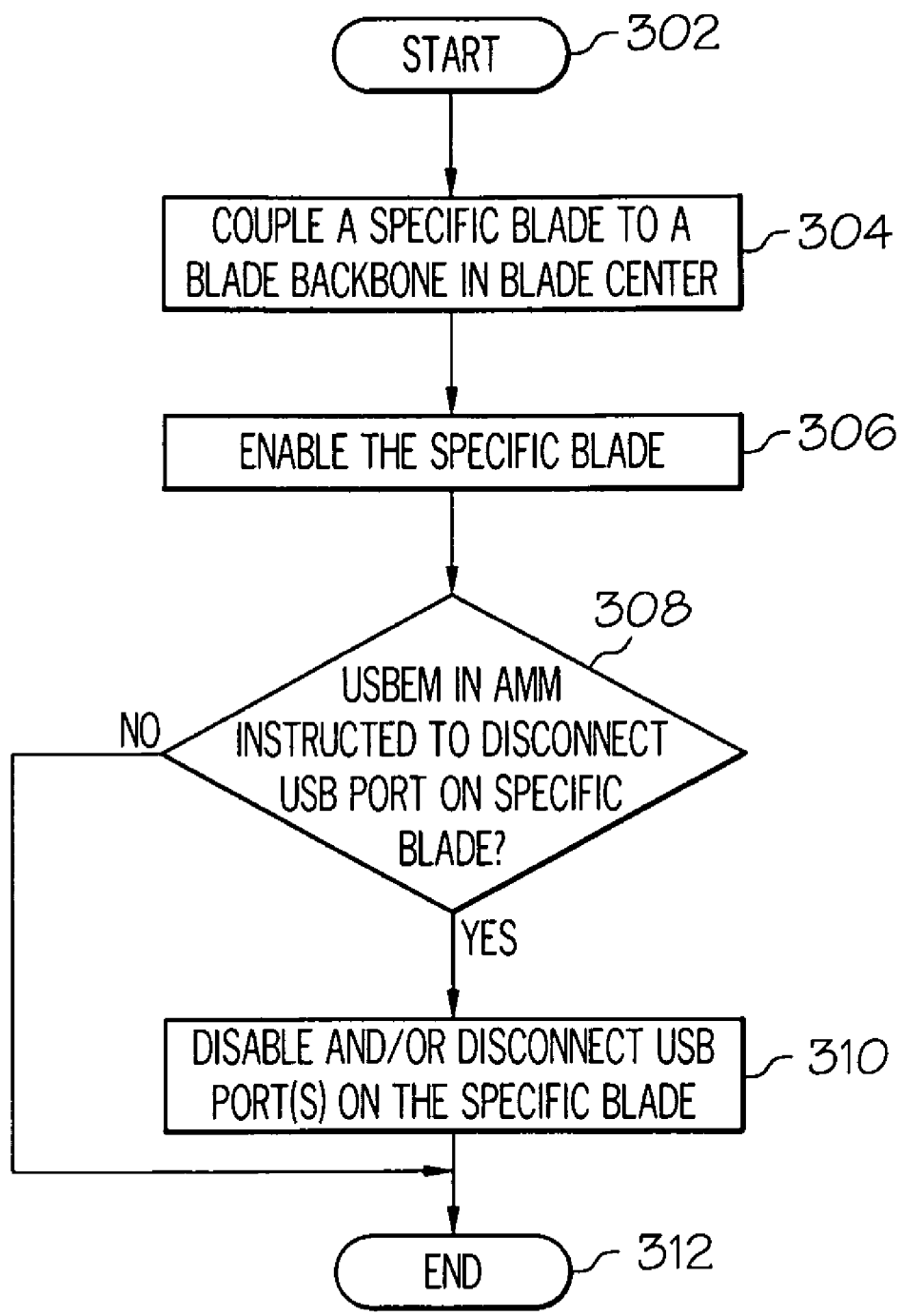
FIG. 3 is a flow-chart of exemplary steps taken to manage USB port connections in a blade center.

With reference now to FIG. 3, a high-level flow chart describing exemplary steps to manage USB ports in a blade center is presented. After initiator block 302, blade(s) are coupled to a backbone in a blade center (block 304) and enabled (block 306). Assuming that this enablement includes the enablement of USB ports in the blades, a query is made as to whether an instruction has been received (e.g., from a remote computer) to disable one or more of those USB ports (query block 308). More specifically, a query is made as to whether the USB Enablement Manager in the AMM has been instructed to disconnect a specific USB port. If so, then that specific USB port is physically disconnected and/or logically disabled (block 310), in a manner described above. The process ends at terminator block 312.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA. Applying the VHDL instructions to the VHDL chip not only causes a physical transformation of the VHDL chip, but such VHDL instruction application can also cause a specifically loaded VHDL chip to be newly coupled (physically and/or logically) to other hardware within a computer system, thus causing an additional physical transformation of the computer system.

Having thus described the invention of the present application in detail and by reference to illustrative embodiments thereof, it will be apparent that modifications and variations are possible without departing from the scope of the invention defined in the appended claims.

What is claimed is:
1. A computer-implemented method comprising:
utilizing a processor in a computer system to execute a set of software instructions, wherein the software instructions, when executed, perform the steps of:
receiving an instruction to disable a specific local physical port of a specific computer blade in a blade center;
utilizing the instruction to disable the specific local physical port by using a software command to a port controller that is associated with the specific local physical port;
utilizing the instruction to control a multiplexer that selectively couples local physical ports to an external physical port hub, wherein the multiplexer physically disconnects the specific local physical port;
utilizing the instruction to create a Very High Definition Language (VHDL) hardware emulation program, wherein the VHDL hardware emulation program describes a unique hardware interface between a system bus, in the specific computer blade, and the specific local physical port of the specific computer blade; and
executing the VHDL hardware emulation program to program a VHDL chip that functions as the unique hardware interface between the system bus and the specific local physical port of the specific computer blade, wherein programming the VHDL chip transforms the specific computer blade into a uniquely transformed machine.

2. The computer-implemented method of claim 1, wherein the instruction is received from a remote user computer.

3. The computer-implemented method of claim 1, wherein the local physical ports are USB ports.

4. The computer-implemented method of claim 1, wherein the VHDL chip is coupled to but is external to the computer system.

5. A computer-readable storage medium on which is encoded a computer program, the computer program comprising computer executable instructions configured for:
   receiving an instruction to disable a specific local physical port of a specific computer blade in a blade center;
   utilizing the instruction to disable the specific local physical port by using a software command to a port controller that is associated with the specific local physical port;
   utilizing the instruction to control a multiplexer that selectively couples local physical ports to an external physical port hub, wherein the multiplexer physically disconnects the specific local physical port;
   utilizing the instruction to create a Very High Definition Language (VHDL) hardware emulation program, wherein the VHDL hardware emulation program describes a unique hardware interface between a system bus, in the specific computer blade, and the specific local physical port of the specific computer blade; and
   executing the VHDL hardware emulation program to program a VHDL chip that functions as the unique hardware interface between the system bus and the specific local physical port of the specific computer blade, wherein programming the VHDL chip transforms the specific computer blade into a uniquely transformed machine.

6. The computer-readable storage medium of claim 5, wherein the instruction is received from a remote user computer.

7. The computer-readable storage medium of claim 5, wherein the local physical ports are USB ports.

8. The computer-readable storage medium of claim 5, wherein the computer executable instructions are provided by a service provider to an execution computer in an on-demand basis.

\* \* \* \* \*